UNITED STATES PATENT OFFICE.

CHARLES M. SHIPMAN, OF NEWARK, NEW JERSEY.

METHOD OF PREVENTING THE PASSAGE OF GASES OF COMBUSTION THROUGH THE WALLS OF FURNACES OR OTHER CONTAINERS.

1,387,739.	Specification of Letters Patent.	Patented Aug. 16, 1921.

No Drawing. Application filed December 26, 1916, Serial No. 138,959. Renewed November 24, 1920. Serial No. 426,306.

*To all whom it may concern:*

Be it known that I, CHARLES M. SHIPMAN, a citizen of the United States, residing at Newark, in the county of Essex and State of New Jersey, have invented certain new and useful Improvements in Methods of Preventing the Passage of Gases of Combustion Through the Walls of Furnaces or other Containers; and I do hereby declare the following to be a full, clear, and exact description of the invention, such as will enable others skilled in the art to which it appertains to make and use the same, reference being had to the accompanying drawings, and to characters of reference marked thereon, which form a part of this specification.

This invention has reference, generally, to a novel process or method of treating the walls of electric and other furnaces, or other containers, such as melting pots, saggers, and the like, in such a manner, that the said walls are made impervious to the hot gases of combustion at high temperatures.

With the usual electric and other furnaces, as well as with such other articles of manufacture, as muffles, melting pots, saggers, and the like, now in general use, it has been found in practice, that the hot gases at high temperatures invariably shorten the life of the walls of the furnaces, or other articles, and in many instances nullify reactions taking place in the furnace, or the like, and especially is this the case where the source of heat is due to a gas, such as coal gas.

My present invention, therefore, has for its principal object, a novel composition of matter, as well as a novel process or method for rendering the walls of electric and other furnaces, as well as the walls of other articles of manufacture, such as muffles, melting pots, saggers, and the like, impervious to the hot gases of combustion at high temperatures, and thereby prolonging the life of such furnaces, or other containers.

Other objects of the present invention not at this time more particularly enumerated will be clearly understood from the following detailed description of the present invention.

I have found in practice, that the usually porous walls of the furnace, or other container, if filled, either upon their interior or exterior surface, as may be desired, with a composition of matter which has a melting point just under that at which the hot gases are harmful, and the said composition of matter or material is selected so as to have a coefficient of expansion and contraction about the same as that of the wall-material, there will be no passage of destructive gases into or through the walls, thus very materially adding to the resisting powers of the walls.

With the various objects of the present invention in view, the invention consists, primarily, in the novel composition of matter hereinafter set forth and for the purposes herein-above stated; and, the invention consists, furthermore, in the novel process or method of treating the walls of furnaces and other containers in the manner and with the said composition of matter more fully described in the following specification, so as to render the walls of furnaces and other containers impervious to and preventing the passage of gases of combustion through the said walls of furnaces or other containers.

The following illustrates a specific example in carrying out the principles of the present invention.

In the production of the walls of a furnace or other container, I select a good fire-clay and mix the same thoroughly with well ground and burnt silicious sand, adding to this mixture graphite or graphitic carbon. This mixture is then mixed with water, and properly stirred so as to provide a dough-like mass or condition of the mixture. This composition of matter is then formed into tiles or plates of suitable and proper size or sizes to be used in producing the walls of an electric or other furnace; or, it may be otherwise suitably shaped into the forms of muffles, melting pots, saggers, and the like.

The following is the preferred proportion of the ingredients which provide the above-stated composition of matter.

Fire clay _____ 40 parts.
Ground burnt silicious sand _____ 30 parts.
Graphite or graphitic carbon _____ 30 parts.
Water, sufficient to produce a dough-like mass.

After having formed a tile or plate for use in a furnace, or other uses; or, having made any other container of any other desired shape, my next step is to dip the tile or plate, or other container, into a slurry made of clay, silica, and pulverized glass or water glass, which penetrates the wall or walls of the tile, plate, or other container, as will be evident.

The following is the preferred proportion of the ingredients of the above-described slurry or mixture.

Clay ---------------------------------- 4 parts.
Silica --------------------------------- 5 parts.
Pulverized glass or water glass ----- 5 parts.

When the tile or plate, or other suitably shaped container has been dipped into the above-mentioned slurry, and in the embodied form of the walls of a furnace, or other suitably shaped container, is subjected to hot gases of combustion at high temperatures, say at 1600 to 1800 degrees Fahrenheit, the graphite or graphitic carbon beneath the surface combines with the silica at the surface and forms a hard and impervious skin or covering.

Walls of a furnace or other container are thereby made positively resistant to the destructive heat and impervious to the passage of the gases of combustion, or the like, at high temperature, into or through the wall or walls of the furnace or other container.

Of course I am aware, that the proportions of the various ingredients as hereinabove stated may be varied, if deemed advisable, without departing from the scope of my present invention. Hence, I do not limit my present invention to the exact proportions of the ingredients of the composition of matter, as herein-above stated.

I claim:—

1. The herein described method of rendering the walls of furnaces or other containers impervious to the passage of hot gases of combustion or the like, which consists in treating the said walls to a slurry of clay, silica, and water glass, and subjecting the so-treated walls to the action of hot gases of combustion, or the like.

2. The herein described method of rendering the walls of furnaces or other containers impervious to the passage of hot gases of combustion or the like, which consists in treating the said walls to a slurry of clay, four parts, silica, five parts, and water glass, five parts, and subjecting the so-treated walls to the action of hot gases of combustion, or the like.

3. The herein described method of rendering the walls of furnaces or other containers impervious to the passage of hot gases of combustion or the like, said walls consisting of a mixture of fire clay, ground burnt silicious sand, graphite or graphitic carbon, and water, treating the said walls to a slurry of clay, silica, and water glass, and subjecting the so-treated walls to the action of hot gases of combustion or the like.

4. The herein described method of rendering the walls of furnaces or other containers impervious to the passage of hot gases of combustion or the like, said walls consisting of a mixture of fire clay, forty parts, ground burnt silicious sand, thirty parts, graphite or graphitic carbon, thirty parts, and water, treating the said walls to a slurry of clay, four parts, silica, five parts, and water glass, five parts, and subjecting the so-treated walls to the action of hot gases of combustion or the like.

In testimony that I claim the invention set forth above I have hereunto set my hand this 20th day of December, 1916.

CHARLES M. SHIPMAN.

Witnesses:
 FRED C. FRAENTZEL,
 FRED'K H. W. FRAENTZEL.